United States Patent [19]

Rudolph

[11] 4,072,996

[45] Feb. 7, 1978

[54] METHOD AND ARRANGEMENT FOR ARC QUENCHING IN ARRESTERS

[75] Inventor: Rene Rudolph, Zurich, Switzerland

[73] Assignee: BBC Brown, Boveri & Company Limited, Baden, Switzerland

[21] Appl. No.: 696,228

[22] Filed: June 15, 1976

[30] Foreign Application Priority Data

July 29, 1975 Switzerland ........................ 9845/75

[51] Int. Cl.[2] .............................................. H02H 9/06

[52] U.S. Cl. ........................................ 361/134; 315/36

[58] Field of Search .................. 361/133, 134; 317/74; 315/36

[56] References Cited

U.S. PATENT DOCUMENTS

| | | | |
|---|---|---|---|
| 3,159,765 | 12/1964 | Schultz et al. | 361/134 X |
| 3,531,690 | 9/1970 | Sakshaug et al. | 361/134 X |
| 3,543,097 | 11/1970 | Smith | 361/134 |

*Primary Examiner*—Harry E. Moose, Jr.

*Attorney, Agent, or Firm*—Pierce, Scheffler & Parker

[57] ABSTRACT

An electrical arrester includes one or more pairs of electrodes disposed within quenching chambers which form current-limiting quenched spark gaps connected in series with an associated blow-out coil for magnetically influencing the arc in the quenching chambers. During the quenching operation, the blow-out coil is short-circuited and two different embodiments are disclosed for effecting this result. In one embodiment, the quenching chamber includes a short-circuiting electrode in the vicinity of that one of the electrodes of a pair which is conductively connected to one end of the blow-out coil and the other end of the latter is conductively connected to the short-circuiting electrode. In the other embodiment, the arrester includes a pair of auxiliary electrodes disposed within an auxiliary chamber and forming a by-pass spark gap connected in parallel with the blow-out coil. A short-circuiting electrode is also disposed in the auxiliary chamber in the vicinity of that one of the auxiliary electrodes that is connected to one end of the blow-out coil and the opposite end of the latter is conductively connected to the short-circuiting electrode.

4 Claims, 4 Drawing Figures

METHOD AND ARRANGEMENT FOR ARC QUENCHING IN ARRESTERS

Figure 1:
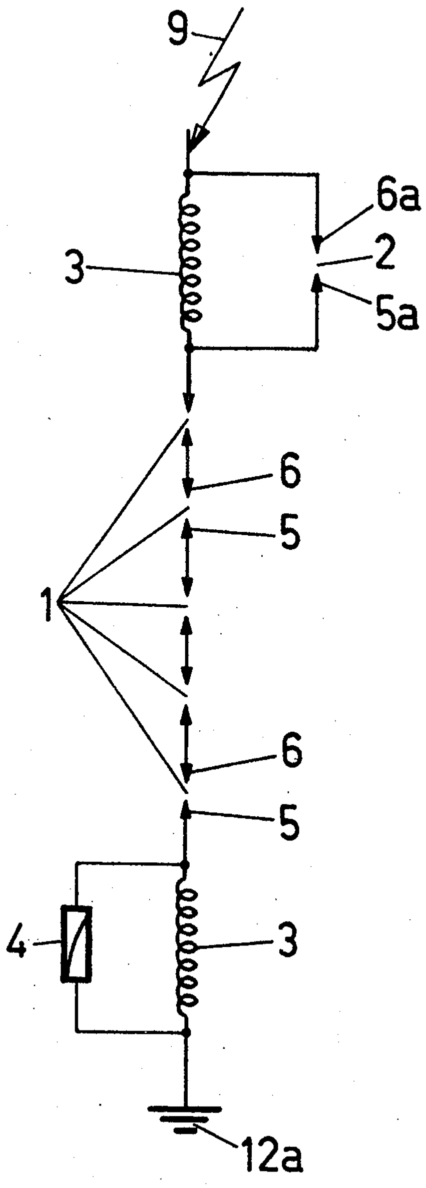

The present invention relates to an improved method of and arrangement for arc quenching in arresters, with at least one current-limiting quenched spark gap and at least one blow-out coil for magnetically influencing the arc in the quenching chamber.

Swiss patent specification No. 549,883 discloses arresters which are provided with a series circuit comprising a plurality of curent-limiting quenched spark gaps and blow-out coils. The blow-out coils in this case are connected parallel to non-linear resistors to protect the blow-out coils against overvoltages which are the result of very large changes of the follow-up current. The blow-outs coils can however also be protected against the above-mentioned overvoltages by means of parallel-connected spark gaps, so-called by-pass spark gaps, instead of by non-linear resistors.

Each quenched spark gap conventionally comprises a pair of electrodes which are disposed in a quenching chamber. Quenching chambers comprise electrically non-conductive, refractory discs which are stacked one above the other and are porous if necessary. Several of such stacked discs form a spark gap stack, each of the discs forming the cover for one and the bottom for the next quenching chamber, with the exception of the two endplates. The space disposed between the bottom and the cover, referred to as the chamber gap, is defined inter alia by the height of an annular bead on the relevant quenching chamber. This bead also forms a relatively gas-tight seal for the appropriate quenching chamber with respect to the exterior.

Each set of by-pass spark gap electrodes, which are provided in pairs, is also situated in a by-pass chamber which is similar to the previously described quenching chambers.

If a sufficiently large overvoltage occurs on an arrester of the previously described kind, the serially connected quenched spark gaps and eventually and by-pass spark gaps that may be present will strike and the overvoltage will be reduced. An electric voltage, referred to as the quenching voltage, will subsequently be built up in the arrester so that the resultant follow-up current is limited and reduced, despite the voltage which acts from the outside, so that the quenched spark gaps are able to perform the quenching operation.

The last-mentioned follow-up current, which initially flowed through the resistors or by-pass spark gaps connected in parallel with the blow-out coils, gradually begins to flow through the blow-out coils. This results in a magnetic field being built up which is utilized for driving the arcs in the quenching chambers from the place at which they are struck to the inner edge of the associated quenching chambers. After a specific time has elapsed the relevant arc will burn along the inner edge of its quenching chamber and, being elongated in this manner, will build up the desired quenching voltage as a result of which the follow-up current diminishes correspondingly. The current in the blow-out coils diminishes together with the follow-up current, the effect of this on the quenching capacity of the arrester being as described below.

The reduction of the current in the blow-out coil reduces the magnetic field thereof with the consequence that the arc voltage and therefore the quenching voltage is reduced. The reduction of the current in the blow-out coil also results in the induction therein of a voltage which acts against the quenching voltage or partially compensates it.

The German Offenlegungsschrift No. 2,008,219 discloses an arrester with a discharge gap system and with a coil, which produces a magnetic field and lengthens the arc produced in the discharge gap by overvoltages acting on the arrester. The arc voltage in this arrester can be regulated so that the build-up of voltage across the arc after striking can be restricted for a predefined time. The means for controlling coil energization comprise non-linear resistors which are connected parallel to the coil and also comprise the fact that the coil incorporates a pre-defined number of turns to produce an inductive reactance which is greater than the impedance of the non-linear resistance means so that the coil energization is insufficient to elongate the arc for a pre-defined time after the discharge gap system has struck, but after the said time has elapsed the coil energization is sufficient to produce a magnetic field which will elongate the arc. More particularly, the means for controlling coil energization can comprise a frequency-dependent impedance which is connected in series with the coil and the non-linear resistance means may comprise an auxiliary gap or by-pass spark gap.

The last-described arrester therefore calls for a coil with a large inductance. Moreover, the quenching capacity of a system with an arrester of this kind is adversely affected in two respects. On the one hand, the magnetic field and therefore the arc voltage or quenching voltage produced by the blow-out coil in such an embodiment is reduced. On the other hand, reducing the blow-out coil current results in a voltage being induced in the coil, this induced voltage acting against the quenching voltage and offsetting it with detrimental effects on the quenching capacity.

It is the object of the invention to improve the quenching capacity of arresters by adopting measures and means as a result of which the current and related magnetic field of the blow-out coil diminish less rapidly with a diminishing follow-up current than that which takes place in a conventional arrester and where such means substantially avoid any partial offsetting of the quenching voltage by preventing the appearance of a large negative voltage drop across the blow-out coil.

According to the invention this problem is solved in that the blow-out coil is short-circuited in the course of the quenching procedure. To this end, it is particularly advantageous for the blow-out coil to be short circuited by means of the arc through an auxiliary spark gap comprising one of the two electrodes associated with the spark gap, which is electrically nearest to the blow-out coil and a short-circuiting electrode, situated near the first-mentioned electrode which is electrically conductively connected to one end of the blow-out coil, the short-circuiting electrode being so connected to the other end of the blow-out coil.

According to a preferred embodiment, the quenched spark gap is connected in series with the blow-out coil. To this end, it is advisable to provide a short-circuiting electrode near the electrode of the quenched spark gap which is connected to one end of the blow-out coil by means of an electrical conductor, this short-circuiting electrode being connected to the other end of the blow-out coil by means of an electrical conductor. Screening, which prevents early starting of a short circuit via the auxiliary spark gap and partially isolates the short-circuiting electrode from the arc which occurs on the spark gap, is provided to this end between the previously-mentioned electrode of the quenched spark gap on the one hand and the short-circuiting electrode on the other hand.

According to another advantageous embodiment, the auxiliary spark gap can comprise one of the two electrodes of a bypass spark gap, i.e., a spark gap connected parallel to the blow-out coil, and a short-circuiting electrode which is adjacent to the previously-mentioned electrode. To this end, it is advantageous to connect the short-circuiting electrode to one end of the blow-out coil and to form the auxiliary spark gap together with the bypass spark gap electrode which is connected to the other end of the blow-out coil. Screening means which partially isolate the short-circuiting electrode from the arc at the by-pass spark gap are also provided in this embodiment on the one hand between the short-circuiting electrode and on the other hand between the electrodes of the by-pass spark gap. It is particularly advantageous if the screening comprises a part which leaves a gap between itself and the inner edge of the by-pass or auxiliary spark gap chamber on both sides of the short-circuiting electrode and adjoins with one of its ends on the electrode of the by-pass spark gap while its other free end enables the arc to pass through the gap to the short-circuiting electrode.

In the present phase of its technological development the improvement provided by the invention therefore solves the problem of known arresters which are excessively stressed when in operation; this is the case more particularly because increasing demands are made on the energy absorption capacity of modern arresters. The cross-section of the blow-out coil and therefore its inductance continues to increase in the kind of arresters used at present; this is because the magnetic field must be progressively strengthened so that the arc voltage rises accordingly and sufficiently rapidly. However, the simultaneous increase in the follow-up current also involves its change with respect to time. This in turn results in increased stressed being imposed on the blow-out coil and on the non-linear resistor connected parallel thereto so that the initially-described weaknesses of known arresters in use hitherto become more noticeable.

The important advantage achieved by the invention is the improvement of the quenching capacity of arresters with relatively simple means and measures, i.e., they can be adapted more readily to the increasing stresses applied to them while their restriking stability is also increased.

Figure 2:
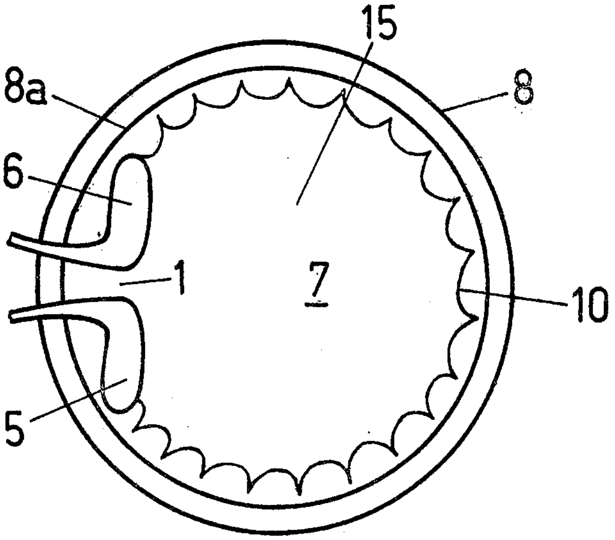
Figure 3:
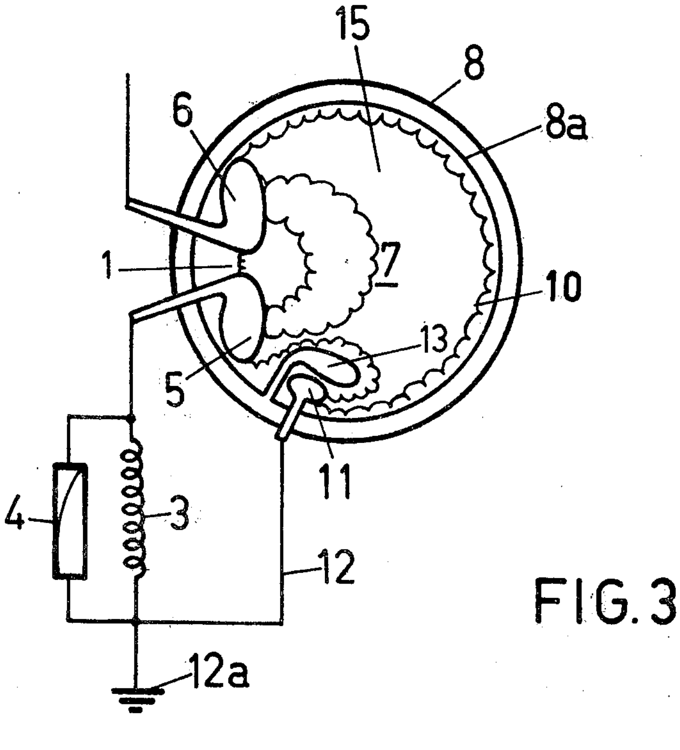
Figure 4:
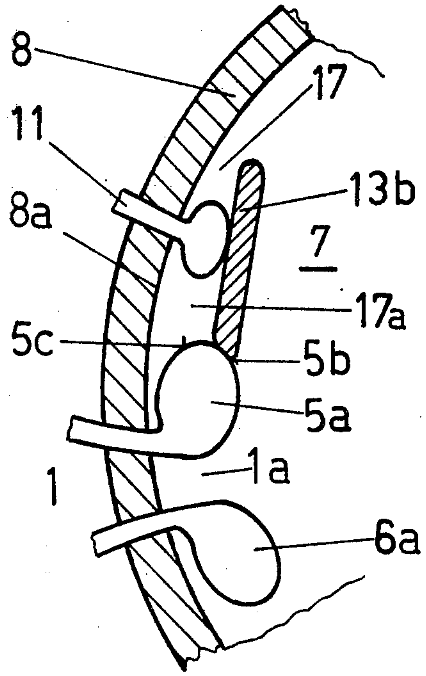

A preferred embodiment of the invention is described hereinbelow by reference to the accompanying drawings, in which:

FIG. 1 is a circuit employed with arresters and is substantially as disclosed by the Swiss patent specification No. 549,883, FIG. 2 is a plan view of a known quenching chamber with a quenched spark gap, an arc, which already burns on the inner edge of the quenching chamber, being indicated, FIG. 3 shows the plan view of a quenched spark gap chamber according to the invention with a short-circuiting electrode for the blow-out coil and associated screen, the connected blow-out coil together with a parallel-connected non-linear resistor being also shown, FIG. 4 is a modification of the embodiment of FIG. 3 showing a different screen arrangement for the short-circuiting electrode.

In FIG. 1, the serially-connected spark gaps 1, referred to as quenched spark gaps, are connected in series with blow-out coils 3. The blow-out coils 3 can be protected against overvoltages, as mentioned initially, but means of non-linear resistors 4, connected parallel thereto, or by means of parallel-connected spark gaps 2, referred to as by-pass spark gaps. Each of the quenched spark gaps 1 in this case comprises two electrodes 5 and 6, while the electrodes of the by-pass spark gaps 2 are designated with the numerals 5*a* and 6*a*. The overvoltage which occurs on the plant side of the arrester, is symbolically indicated at position 9 and the earth-side connection of the system is designated 12*a*.

FIG. 2 is a plan view of a known quenching chamber 7, open on the side facing the observer. The substantially cylindrical side wall of the quenching chamber 7 appears as an annular bead 8, disposed on the bottom 15; the inner edge of this bead is also the inner edge of the quenching chamber 7 and is designated 8*a*. The arc which proceeds from and terminates respectively at the electrodes 5 and 6 of the quenched spark gap 1 and already burns on the inner edge of the quenching chamber 7 is designated 10.

FIG. 3 shows an embodiment of the invention in which the quenching chamber 7 is shown in plan view. Items corresponding to those in FIGS. 1 and 2 have the same reference numerals. The electrodes 5 and 6 of a quenched spark gap 1 are again disposed in a quenching chamber 7 with a bead 8. The electrode 5 in this case is directly connected by means of an electrical conductor to one end of the blow-out coil 3, the electrode 6 being connected to the nearest serially-connected quenched spark gap 1, for example as in FIG. 1. A short-circuiting electrode 11, connected via the electrical conductor 12 to the other end of the blow-out coil 3, is disposed near the electrode 5.

If an overvoltage occurs on the arrester according to the invention, there will initially be no change in the method of operation as already described at the beginning. The follow-up current flows through the blow-out coil 3 whose magnetic field drives the arc (10 in FIG. 2) across the main spark gap 1 to the inner edge 8*a* of bead 8 which is also the inner edge of quenching chamber 7 as indicated in FIG. 2. The travelling arc reaches the short-circuiting electrode 11 at a time which is not too early and can be defined, more particularly by the shape of the screening 13. The blow-out coil 3 will be short-circuited from this time onwards. The coil current in the circuit 12, 3, 5, and 11 (auxiliary spark gap) is therefore independent of the course of the follow-up current in the current path 6, 11, and 12*a* so that the properties or advantages of the arrester are obtained in accordance with the invention in terms of the object thereof.

Suitable construction and arrangement of the screening 13 interposed between electrode 5 and the short-circuiting electrode 11 enables the short-circuit time of the blow-out coil 3 to be defined so that the desired current flows through the coil 3. The time constant of the decay of the coil current in the short-circuited coil is defined in this case by the coil inductance and by the ohmic resistance of the circuit 12, 3, 5, and 11. The arrangement according to FIG. 3 can also be used if a by-pass spark gap is provided in place of the by-pass resistor 4. Different phases of the arc up to the point at which the coil 3 is short-circuited are schematically indicated in FIG. 3.

Another embodiment and arrangement of the means for screening the short-circuiting electrode 11 representing a modification of the embodiment shown in FIG. 3 is illustrated in FIG. 4. The electrodes situated near the inner edge 8*a* of the quenching chamber 7 are designated with the numerals 5*a* and 6*a*. The screening 13*b* is constructed so that a gap 17 or 17*a* of adequate size remains between the screening and the edge 8*a* so that the arc of the follow-up current can continue to burn through the gap at a time which is not too early after striking. First, the cathode spot of one end of the arc will reach the place 5*b*. The cathode spot 5*c* appears simultaneously with the extinction of the cathode spot 5*b* as the arc strikes around the screening 13*b* to the short-circuiting electrode 11, and thereafter the arc burns through the gap 17*a* between 11 and 5*a*.

One advantage of the modification according to FIG. 4*a* is due to the fact that no arc continues to burn near the striking place 1*a* after the cathode spot 5*b* is extinguished and the last mentioned modification therefore offers a particularly good resistance to restriking.

I claim:

1. An electrical arrester comprising at least one pair of electrodes disposed within an arc quenching chamber and forming a current-limiting quenched spark gap connected in series with an associated blow-out coil for magnetically influencing the arc in said quenching chamber, an auxiliary electrode disposed in said quenching chamber in the vicinity of that one of said electrodes which is conductively connected to one end of said blow-out coil, and the other end of said blow-out coil being conductively connected to said auxiliary electrode which latter functions to short-circuit said coil during the quenching operation, and a screen interposed between said auxiliary short-circuiting electrode and that one of said electrodes which is conductively connected to one end of said blow-out coil.

2. An electrical arrester as defined in claim 1 and which further includes a non-linear resistor connected in parallel with said blow-out coil.

3. An electrical arrester as defined in claim 1 wherein said screen is interposed between said electrodes in such manner as to establish a gap between itself and the inner edge of said chamber at both sides of said short-circuiting electrode, one end of said screen adjoining that one of said electrodes which is conductively connected to one end of said blow-out coil and the other end being so located as to afford access for the arc through said gap to said short-circuiting electrode.

4. An electrical arrester as defined in claim 1 and which further includes a spark-gap connected in parallel with said blow-out coil.

* * * * *